United States Patent

[11] 3,582,662

| [72] | Inventor | Emil Henry Soika |
| | | Waukegan, Ill. |
| [21] | Appl. No. | 25,768 |
| [22] | Filed | Apr. 6, 1970 |
| [45] | Patented | June 1, 1971 |
| [73] | Assignee | Abbott Laboratories |
| | | North Chicago, Ill. |

[54] RADIATION SENSITIVE ELECTRONIC FLOW GAUGING SYSTEM
6 Claims, 2 Drawing Figs.

[52] U.S. Cl. ................................................. 250/222,
250/218, 73/209
[51] Int. Cl. ....................................................... G01n 21/26
[50] Field of Search ............................................ 250/218,
209, 208, 222; 356/208, 207; 73/209, 37.5;
340/239

[56] References Cited
UNITED STATES PATENTS
3,163,176 12/1964 Darling ......................... 250/218X
3,193,816 7/1965 Brath ............................. 340/239
3,233,457 2/1966 Martinez ....................... 73/209X
3,416,371 12/1968 Locke ............................ 73/209

Primary Examiner—Walter Stolwein
Attorney—Robert L. Niblack

ABSTRACT: A rotameter is adapted to relay a signal that indicates whether the opaque float ball of the rotameter is within some predetermined longitudinal segment of the transparent rotameter tube. A solar cell is mounted on one side of the tube and a light source mounted on the other side. The cell is mounted in a position to monitor and receive light emitted from the light source which has passed through that segment of the tube. The output of the cell is amplified and applied to a signal means. When the float ball is outside the monitored segment of the tube, the cell receives all the incident light from the light source. When the float ball enters the monitored segment, it casts its shadow on the cell, and so long as the ball remains in that segment, the output of the cell is reduced thereby reducing the amplified output which is noted by the signal means.

PATENTED JUN 1 1971

3,582,662

Inventor
EMIL H. SOIKA
By Edmund D. Riedl
Attorney

3,582,662

RADIATION SENSITIVE ELECTRONIC FLOW GAUGING SYSTEM

DISCLOSURE OF THE INVENTION

This invention relates to the measurement of fluid flow. More particularly, this invention relates to an apparatus for determining whether the fluid flow rate through an aperture is within a predetermined range. In particular, this invention is concerned with an apparatus that enables one to measure and to determined whether the flow rate through some assembly is within an acceptable range.

Although the apparatus of this invention is capable of measuring the fluid flow rate through any assembly to which it can be connected, it is especially well suited for the measuring the gauge of hollow piercing point needles, such as hypodermic needles, and especially needles that are used in conjunction with infusion sets suitable for the administration of parenteral fluids.

One very important consideration in the production of such infusion sets is the inclusion of a quality control step that ascertains whether the flow of parenteral fluid through the set will be within an acceptable range. Such a step is vital to the satisfactory performance of such sets and is necessary because needles that have been manufactured to a nominally exact gauge often are found to have an aperture diameter that is insufficient or more than sufficient to deliver a satisfactory quantity of fluid during administration.

Therefore the primary object of this invention is to provide an apparatus that will electronically gauge the diameter of various hollow piercing point needles.

Another object of this invention is to provide an apparatus that signals if the fluid flow is within desirable limits.

A still further object of this invention is to provide a highly reliable means for measuring the air flow rate through some impedance such as a hollow piercing point needle and determining whether the flow rate of a liquid of known viscosity will be within defined limits.

Other objects and advantages of this invention will become apparent upon reference to the accompanying drawing in which.

Figure 2:
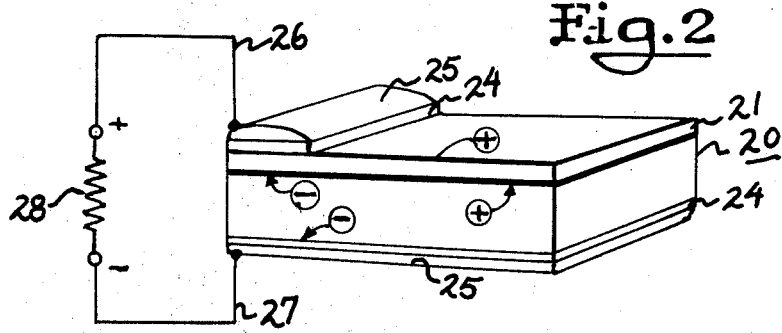
FIG. 2 is a diagrammatic view of the solar cell used in the device shown in FIG. 1.

Referring first to FIG. 2, the solar cell shown is of the type manufactured by the Solar Systems Division of the Tyco Co., Skokie, Ill. 60076. Cell 20 comprises a layer of P-type silicon 21 and a layer of N-type silicon 22 forming a PN junction 23 therebetween. A nickel strike 24 is plated on the outer surface of the N-type silicon layer 22 and upon a sufficient portion of the P-type silicon layer 21 to enable a coating of solder 25 to be affixed to nickel strike 24 and thereby provide for the attachment of electrical leads 26, 27. Clearly, neither the nickel strike nor the solder should cover more of the outer surface of P-type silicon layer 21 than is necessary or it will interfere with and reduce the area available to receive light radiation incident on P-type silicon layer 21.

The N-type silicon has an abundance of electrons (−) while the P-type silicon material has an abundance of "holes" (+). When light radiation is incident upon the exposed surface of the P-type silicon layer 21, the electrons within cell 20 become excited and "holes" flow into the P-type material and electrons into the N-type material, developing a voltage difference across load 28. The voltage and current in the external circuit comprising leads 26, 27 and load 28 will vary with the quantity of incident light.

Figure 1:
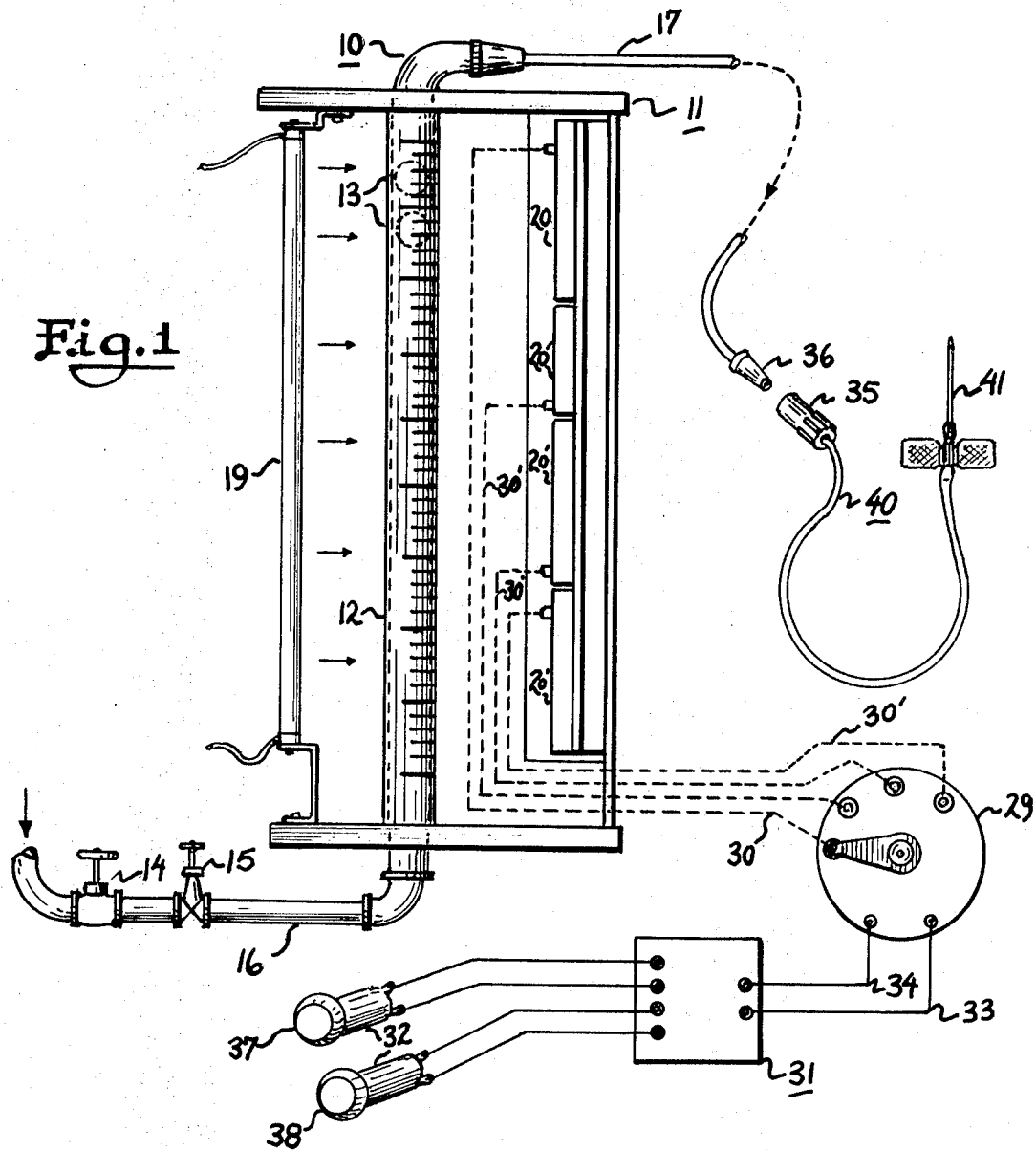
FIG. 1 is a schematic view of the device of this invention.

Referring now to FIG. 1, there is shown a rotameter 10 securely mounted in an upright position within housing 11. Rotameter 10 is of a conventional design well known in the art and comprises a hollow transparent glass tube 12 in which opaque float ball 13 is free to travel longitudinally. Reduction valve 14 and needle adjustment valve 15 in air supply line 16 serve to control the flow of air entering tube 12, flowing therethrough, and flowing out exhaust line 17.

There is also mounted in housing 11 a plurality of cells such as cells 20, 20' which is of the type shown in FIG. 2.

Cell 20, having a length corresponding to the length of the segment of tube 12 which is to be monitored is mounted so that the light sensitive surface of cell 20, the P-type silicon layer 21 faces tube 21. Each of the remaining cells 20' is mounted serially so that each individual cell monitors a distinct and different segment of rotameter 10.

Each cell, including cell 20, is electrically connected by means of leads 30, 30' to selector switch 29. The other lead (not shown) from each cell which completes the circuit is connected directly to switch 29.

Selector switch 29 enables one to select which cell 20, 21' of the series is to be connected to amplifier 31. Thus, one is able to select which segment of tube 12 is to be monitored. As shown in the drawing, lead 30 from cell 20 is connected through switch 29 to amplifier 31 by means of leads 33, 34. Thus, the uppermost segment of tube 12 is shown as being monitored.

The amplifier in the preferred embodiment is model TR3–3 manufactured by the Farmer Electric Co., Natick, Mass. Other amplifiers 31 having the capabilities to receive an input of about 0.3—0.5 volts at 1.5 to 75 milliamperes and produce in response thereto sufficient power to operate a signaling means 32 which can comprise a visual device such as a meter or a colored light or an audible device such as a buzzer.

A light source 19 is mounted in housing 11 so that tube 12 spaces cell 20 and light source 19. The light emitted from source 19 is directed through tube 12 to cell 20. Light source 19 is preferably mounted so that light emitted from source 19 is shielded from striking P-type silicon layer 21 of cell 20 unless it has first passed through tube 12.

If stray radiation reaches cell 20 without having first passed through tube 12, the sensitivity of cell 20 during operation is reduced.

A suitable light source 19 provides even illumination, preferably having a spectral distribution similar to the response characteristics of cell 20. Generally an incandescent lamp emitting a wave length between 400 and 1100 millimicrons is suitable. Tungsten lamps having a color temperature of about 2,800° K. are particularly well suited. Whatever the source, it should be powered by direct rather than alternating current since AC will cause flicker and since the response times of the cells are faster than 20 microseconds, this flicker will cause undue chatter in the electronic circuit.

The preferred light source is a 0235 line filament lamp manufactured by Lamps, Inc., Gardena, Calif. The lamp is rated 12V is operated at 9V DC to avoid flicker and provide longer life with an even illumination.

During operation, reduction valve 14 and needle valve 15 are used to adjust the flow rate of air through line 16 and tube 12. After the flow rate has been adjusted until float ball 13 fluctuates closely around the top marking on tube 12, it has been determined that a flow rate of 1,250 c.c./minute to 2,000 c.c./minute of 70° F. air at sea level pressure is a range that is equivalent to the desired range of liquid flow rate of parenteral fluid through such gauge needle. From charts supplied with the rotameter, it can be determined what graduation or reading on tube 12 corresponds to this flow rate. For the sake of example, it can be assumed that this range is within the segment of tube 12 corresponding in length to the length of cell 20. The length of cell 20 can be selected to correspond to the proper length of tube 12 spanning the range of graduations that give the desired air flow rate.

Selector switch 29 is turned to channel the input from cell 20 to amplifier 31. To test a 21 gauge needle that is attached to an infusion set 40, end 35 of the set is coupled to end 36 of exhaust line 17.

If the needle 41 has too small a diameter ball 13 falls to the lower regions of tube 12 and the full illumination from light source 19 is incident on cell 20. This develops the maximum output attainable with this illumination level in cell 20 and the amplified output is applied to a double-throw double-pole relay to close the portion of the relay switch that turns on red signal light 37 and turns off green light 38 to thereby indicate a defective part which is rejected by the operator.

If the next set tested allows an air flow rate within the acceptable range to pass therethrough, float ball 13 will fluctuate within the segment of tube 12 that corresponds to that monitored by cell 20.

Float ball 13 casts its shadow on cell 20, thus lowering the voltage and current output of cell 20. Since the amplified output of cell 20 is reduced below a level selected as sufficient to close the relay that operates light 37, green signal light 38 remains on and the operator accepts the infusion set.

When no part is being tested, the ball is driven to the top of tube 12 outside the range which casts a shadow on cell 20. The relay is closed and light 37 is on and light 38 is off.

In a like manner, the amplified output of cell 20 can be used to operate relays that sound buzzers, or give other audio or visual indication of defective or acceptable parts.

Similarly, the invention can be used for process control where a fluid to be used in the process is fed through the rotameter and the flow rate monitored remotely from the rotameter itself thereby eliminating the need for constant visual interrogation, and allowing for automatic correction and adjustment of the flow rate by applying the signal from the amplifier to means for regulating the flow rate.

I claim:

1. An apparatus for gauging the flow rate of a fluid through an orifice comprising: a housing, a light source and a plurality of solar cells mounted in the housing in spaced apart relation to each other; a rotameter having a transparent rotameter tube and an opaque float ball freely mounted within the tube to permit movement of the ball upwardly and downwardly in the longitudinal axis of the tube in response to changes in flow rate disposed between the light source and the solar cells; each of the solar cells having a surface sensitive to light emitted from the light source mounted alongside a different segment of the rotameter tube with the light sensitive surface facing the tube and the light source whereby light emitted from the light source and passing through that segment of the rotameter tube is incident on the surface; means for supplying a regulated pressurized source of fluid to the rotameter; an exhaust means tor venting the fluid from the rotameter; the end of the exhaust means being adapted for attaching thereto an article having an orifice through which the flow rate is to be measured; a switching means, an amplifier means adapted to receive the output of a cell selected by the switching means, and signal means for receiving the amplified output of the selected cell and indicating whether the float ball is within the segment of the rotameter tube monitored by the selected cell.

2. An apparatus according to claim 1 in which said cell has a longitudinal dimension essentially corresponding to the longitudinal segment of the rotameter tube being monitored.

3. An apparatus according to claim 1 in which the solar cell has a P-type silicon surface sensitive to light in the range 400 to 1,100 millimicrons.

4. An apparatus according to claim 1 in which said light source is an elongated tungsten lamp having a longitudinal dimension essentially corresponding to the longitudinal dimension of the rotameter tube.

5. An apparatus according to claim 1 in which said signal means responsive to the amplified output of the selected cell includes a relay and when the output of said cell is at a maximum said relay is open and when the output is reduced said relay is closed.

6. An apparatus according to claim 5 in which said relay is of the double-throw double-pole electrically connected to a pair of indicator lights such that when said relay is closed only one light of said pair is operative, and when said relay is open only the other light of said pair is operative.